July 30, 1935.   A. J. MEYER   2,009,558
CLUTCH
Filed Nov. 24, 1930   2 Sheets-Sheet 1
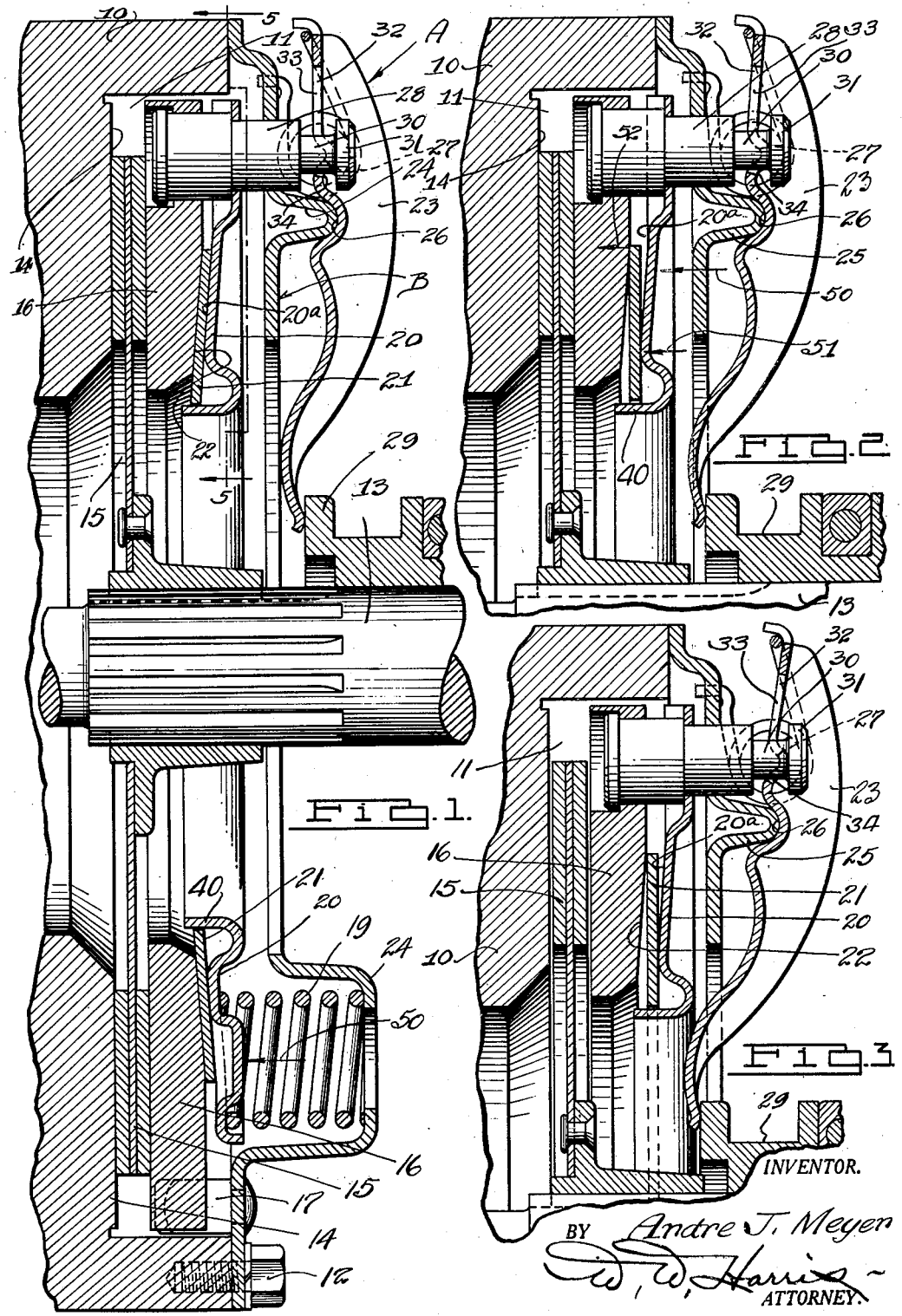
INVENTOR.
BY Andre J. Meyer
ATTORNEY.

July 30, 1935. A. J. MEYER 2,009,558
CLUTCH
Filed Nov. 24, 1930 2 Sheets-Sheet 2
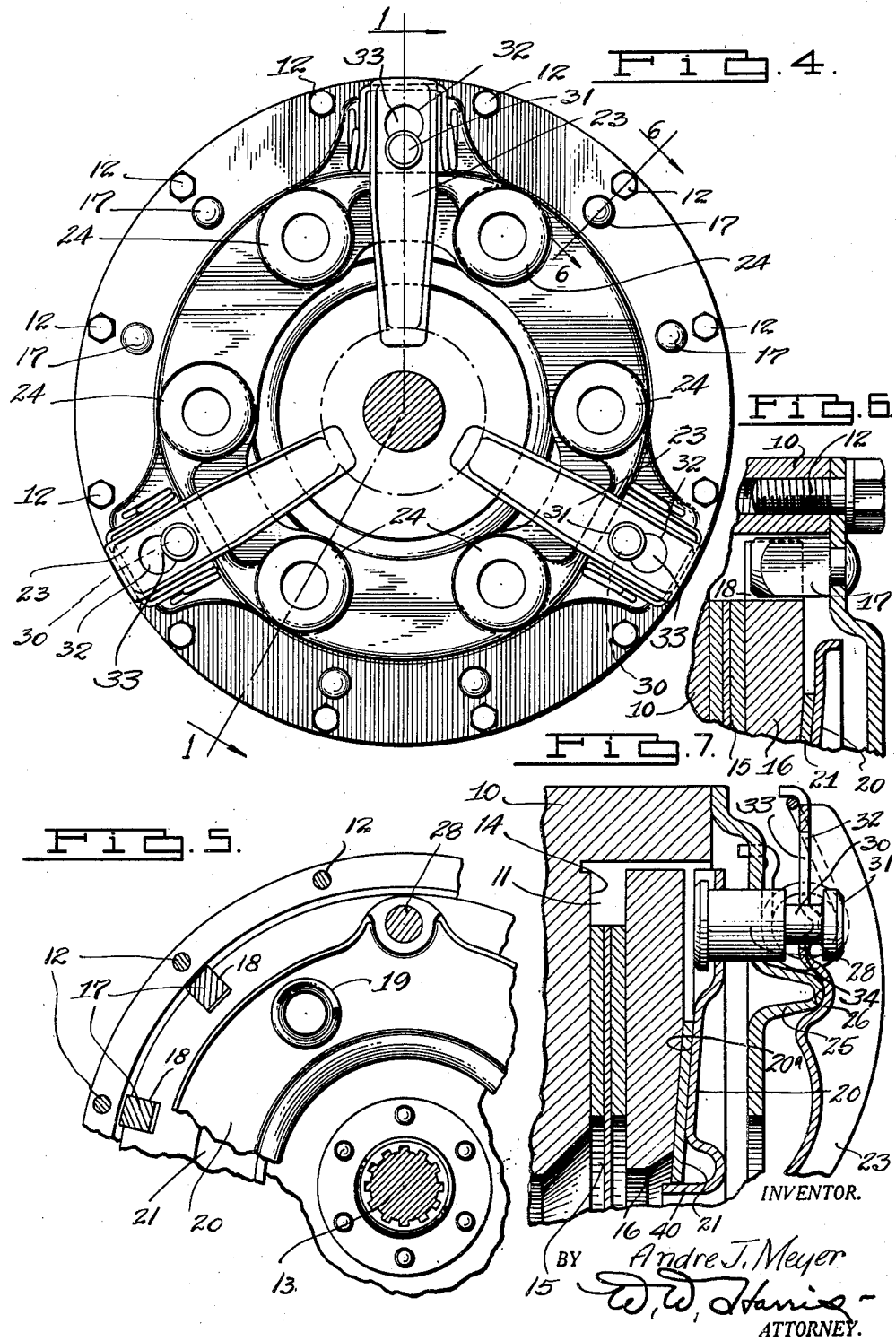
INVENTOR.
Andre J. Meyer
BY W. W. Harris
ATTORNEY.

Patented July 30, 1935

2,009,558

UNITED STATES PATENT OFFICE 2,009,558

CLUTCH

Andre J. Meyer, Detroit, Mich., assignor to Continental Motors Corporation, Detroit, Mich., a corporation of Virginia Application November 24, 1930, Serial No. 497,686

13 Claims. (Cl. 192—52)

My invention relates to clutches and more particularly to clutch devices of the non-grabbing type especially adapted for use with an automobile or other vehicles of a like character, though obviously the principle of my invention may be incorporated in clutch devices employed with other types of machines.

It has been found to be essential to employ clutches of the non-grabbing type with automobiles and other like vehicles to facilitate ease in starting the vehicle or in changing speed. In a great many instances this has been accomplished by providing a clutch disc of the type which is only partially engaged with the driving member of the clutch assembly during the initial clutching action. This partial engagement is effected by providing a relatively small area of the clutch facing for initial engagement with the driving member, thereby providing a spot contact which is subject to relatively more wear than the remaining portions of the clutch disc facings which are engaged with the driving member during the latter part of the clutching action.

The wear of the clutch facings secured to the clutch disc will in a short time necessitate the replacement of the clutch facing and the efficiency of the clutch device is gradually decreased as wear takes place. Such wear is more pronounced in large vehicles such as trucks and busses and frequent replacement of clutch facings in large vehicles is often necessary.

It is the object of my invention to construct a more efficient and improved clutch adapted for assembly with substantially all types of machines, automobiles and other like vehicles by providing a clutch construction in which a gradual smooth non-grabbing engagement of the driving and driven members is made possible.

Another object of my invention is to construct a clutch having driving and driven means adapted for engagement by providing a means which effects a smooth engagement of the said clutch means independently of the clutch pedal operation.

A further object of my invention is to construct a clutch device of novel construction in which the driving and driven means of the clutch assembly are initially engaged during the initial clutching action with a minimum of pressure but engaged during the latter part of the clutching action with a gradually increasing pressure thereby providing a gradual engagement of the clutch driving and driven means.

A still further object of my invention is to provide a clutch device of the type employing means for effecting gradual engagement between the driving and driven means of the clutch by providing a substantially flat spring member or annulus adapted to be actuated in response to a primary yielding means for effecting gradual engagement between said clutch driving and driven means.

A still further object of my invention is to provide a more efficient clutch assembly employing a plurality of primary yielding means acting on a thrust member associated with the driving means of the clutch by providing means which distribute a portion of the forces exerted by said primary yielding means in order to more uniformly distribute the load to the driving means, thereby substantially eliminating warping of the driving means or pressure plate of the clutch assembly.

For a more detailed understanding of my invention, reference may be had to the accompanying drawings which illustrate one form which my invention may assume, and in which:

Figure 1 is a longitudinal sectional view through a clutch assembly constructed in accordance with my invention illustrating the clutch parts in operative engagement for obtaining a direct driving relation between the driving and driven elements of the vehicle such as the engine flywheel and driving shaft and taken on the line 1—1 of Figure 4, Figure 2 is a fragmentary longitudinal sectional view through a portion of the clutch assembly illustrating an intermediate position of the clutch parts and showing the initial engagement of the driving and driven means, Figure 3 is a fragmentary longitudinal sectional view through my improved clutch assembly showing the clutch parts in non-driving relation, Figure 4 is an end elevational view of the clutch, Figure 5 is a fragmentary end view with the clutch housing removed, taken on the line 5—5 of Figure 1, Figure 6 is a detail sectional view taken on the line 6—6 of Figure 4 and showing the means for connecting the engine flywheel and the clutch driving means through an intermediate clutch housing, and Figure 7 is a longitudinal sectional view through a portion of a clutch device showing a modified structure or means for mounting the studs which connect the pressure plate or clutch driving means with the clutch housing or casing that is adapted to be secured to the engine flywheel.

It is generally desirable to provide clutch mechanisms which may be associated with an engine flywheel for connecting the engine with a drive shaft adapted to be operatively connected through suitable mechanisms with a vehicle wheel. In general, the outer or rear face of the flywheel 10 is recessed as at 11 and a substantial portion of the clutch assembly A is housed within the flywheel recess, and preferably, a clutch housing B is secured to the flywheel by means of bolts 12 or other fastening devices, at least some of the clutch parts being preferably supported by the clutch housing. The engine flywheel may be termed a driving member and the drive shaft 13 may be termed a driven member, the flywheel or driving member being provided with a machined face 14 adapted for engagement with a clutch disc 15.

The clutch assembly includes a pressure plate 16 which is operatively connected with the flywheel by means of the driving lugs 17 carried by the housing B and which engage in slots 18 carried by the pressure plate. Preferably I term the pressure plate a driving means and the clutch disc 15 a driven means, said clutch disc being adapted to be clamped between the adjacent faces of the pressure plate and flywheel when the clutch parts are urged into engagement by means of the primary yielding means or springs 19, these primary yielding means exerting a force on said driving means for packing the clutch disc or driven means as described above.

In order to provide a gradual engagement of the driving and driven means of the clutch assembly wherein the driven means or clutch disc is constructed of a flat element, I have provided a thrust member or plate 20 acted on by the primary yielding means or springs 19 and an intermediate secondary yielding means which is interposed between the thrust member and the pressure plate. This secondary yielding means is actuated in response to the primary yielding means for effecting a gradual engagement of the driving and driven means of the clutch assembly and transmits the force of the primary yielding means in such a manner as to provide a gradually increasing pressure between said driving and driven means as the clutch mechanism is actuated. This secondary yielding means preferably consists of a spring annulus 21 which is shown in Figures 2 and 3 as a spring ring adapted for light engagement between the rear face of the pressure plate and the forward face of the thrust member (Figure 3) when the clutch parts are in released position. The rear face of the pressure plate or driving means is slightly bevelled inwardly as at 22 to provide a space for receiving the annulus as it is moved from its normal released position occupying substantially a plane perpendicular with the driven shaft 13 (see Fig. 2) to a frusto-conical position when the clutch is fully engaged (see Fig. 1). The thrust plate 20 preferably has a similarly bevelled or inclined face 20ᵃ cooperating with face 22 to actuate the annulus 21. During the initial clutching action the whole assembly is moved forwardly until it assumes the position shown in Figure 2 in which the clearance between the clutch disc and adjacent flywheel and pressure plate is substantially taken up. Further actuation of the clutch mechanism deflects the spring annulus 21 by reason of the springs 19 and the parts assume a position as shown in Figure 1. As the annulus 21 deflects its stiffness progressively increases as it acquires the load of springs 19 until the annulus transmits the full load or thrust of springs 19 by reason of its resilience.

The clutch assembly is provided with a plurality of clutch levers 23 each of which is fulcrumed on the back of the clutch housing or cover plate B. The housing is provided with depressions or outwardly recessed portions 24 for seating the springs 19. Intermediate two such recessed portions, the housing is provided with a rib or ridge 25 arranged to fulcrum a lever, a sufficient number of such ribs being formed for association with the levers. Each lever is provided with spaced depressions 26 and 27 which respectively engage a rib 25 and a pin 28, the inner end portion of the lever being adapted for engagement with clutch releasing means or collar 29. These pins are each provided with an annular groove 30 near their outer end and a head 31 beyond the groove, the inner side of the head being adapted for engagement with one of said levers 23. Preferably each lever is constructed of a sheet metal channel shaped stamping, the pin 28 extending through the bottom of the channel shaped lever. One embodiment of my invention is to provide a key slot 32 which is constructed with an enlarged portion 33 having a dimension sufficient to permit the head 31 of the pin to be projected therethrough. To assemble the lever, the head of the pin is thrust through the enlarged portion of the slot and then the lever is moved outwardly forcing the shank of the pin into the narrower portion 34 of the slot (see Fig. 2). It will be understood that the narrow portion 34 corresponds to the diameter of the grooved portion 30 of the pin 28. Thus, movement of the inner end of the lever towards the clutch disc or driven means by means of the collar 29 moves the outer end of the lever away from the driven means, and the driving means is also moved away from the driven means or disengaged therefrom because of the connection of the pin with the driving means and lever.

The thrust member or plate 20 is preferably provided with an inwardly extending annular flange 40 adapted to form a support for the spring annulus 21, said annular flange being arranged to extend through the central hole of the spring annulus. It may be observed that the thrust member and spring annulus are preferably coaxially arranged with the driving and driven means as well as the driven member or shaft 13. It may be further noted that the thrust member is permitted to have a limited amount of axial movement relative to the driving means.

It will be noted that the clutch parts are positioned in a predetermined relation with respect to each other so as to substantially distribute the spring load to minimize warping of the pressure plate. The springs 19 exert a force on the thrust member 20 substantially at the central zone thereof as indicated by the arrows 50 in Figures 1 and 2. The thrust member transfers this force to the spring annulus 21 adjacent the inner peripheral edge thereof as indicated by the arrow 51 (Figure 2). The spring annulus annularly distributes the load on the driving means or pressure plate 16, this load being transferred from the outer peripheral edge of the spring annulus to substantially the central zone of the annular pressure plate as indicated by the arrow 52. Thus the load from a plurality of yielding means, such as springs 19, is substantially uniformly distributed over the pressure plate, this load being thereby applied to said pressure plate in such a way as to substantially eliminate the tendency of the pressure plate to warp.

It will be noted that little or no pressure is exerted between the driving and driven means of the clutch in the position shown in Figure 2 since the thrust plate 20 has only been moved a sufficient distance to take up the clearance between the clutch disc and the pressure plate and flywheel. Thus the initial engagement of the clutch disc or driven means of the clutch with the driving means is obtained without the application of any pressure between the driving and driven means, but as the thrust member is moved further under the influence of the springs 19 the spring annulus is deflected and provides for a transmission of a gradually increasing pressure for effecting a gradual engagement between said driving and driven means.

As the clutch is released through actuation of the clutch collar and levers 23 the spring annulus is free to spring back into its original flat condition, shown in Figure 2, and further movement of the clutch mechanism fully disengages the driven means from the driving means by retracting the pressure plate against the resistance of springs 19, the pins 28 having shoulders arranged to engage both the pressure plate and thrust member.

The spring annulus or ring above described is preferably constructed of a single piece of spring steel or other material having like characteristics. It has been observed that a pressure plate even as thick as the one shown in the drawings and which is usually employed with clutches of this character will be warped when employing a yielding means which concentrates the loads at various points on the pressure plate. This provides an undulating or annular warping of the pressure plate and consequently provides high spots on the pressure plate which are the first to engage the driven means. As stated above the object of my invention is to disperse this concentrated loading on the pressure plate by spreading the load over the driving means. It will be noted that the thrust plate is engaged by the springs 19 in a plurality of points about the periphery of the clutch, but by interposing the secondary yielding means between the thrust member and driving means this load is distributed about the annular face of the driving means, some of this pressure being distributed to points relatively remote from the point of application of said force or forces. The annular distributing of the load minimizes the annular deflection of the pressure plate, and in fact my construction is such that the load is rather uniformly distributed and the tendency of the pressure plate to annularly warp has been substantially eliminated.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a clutch, the combination of driving and driven members, driving and driven means respectively connected in driving engagement with said driving and driven members, a plurality of springs surrounding said driven member, said springs acting to urge said driving means into clutching engagement with said driven means, and metallic disc-like means receiving the load of said springs and transmitting said load to said driving means substantially uniformly annularly and radially thereof.

2. In a clutch, the combination with a driving pressure plate and associated driven element, of yielding means urging said plate and element into driving relation, and distortable metallic disc-like yielding means distributing the pressure of said yielding means on said plate to provide substantially uniform pressure around said plate at substantially the mid-section radially thereof.

3. In a clutch, the combination with a driving pressure plate and associated driven element of distortable yielding disc-like means acting on said plate and providing substantially uniform pressure around said plate at substantially the mid-section radially thereof.

4. In a clutch, the combination with a driving pressure plate and associated driven element of a distortable metal annulus acting on substantially the central zone radially of said plate and providing substantially uniform pressure circumferentially around said plate.

5. In a clutch, the combination of a driving member, a driven member, driving and driven means respectively connected in driving engagement with said driving and driven members, a thrust member, yielding means acting on said thrust member, and a spring annulus intermediate the driving means and thrust member for concentrating and distributing the load of said yielding means over substantially mid-portions of the driving means.

6. In a clutch, the combination of a driving member, a driven member, driving and driven means respectively connected in driving engagement with said driving and driven members and adapted for substantially full surface contact during the initial clutching action, primary yielding means, and secondary disc-like yielding means actuated in response to said primary yielding means for distributing the load of said primary yielding means over substantially the mid-section of said driving means.

7. In a clutch, driving and driven members, driving and driven means respectively connected in driving relation with said driving and driven members, clutch releasing means including a pin having an annular groove and operatively connected with said driving means and a lever for operatively connecting said pin with the clutch releasing means, said lever provided with an elongated opening in which the grooved portion of said pin is engaged.

8. In a clutch, the combination of a driven shaft and a disc connected thereto, a driving pressure plate for loading the disc, means for driving the pressure plate, yielding means for loading the pressure plate, means for separating the pressure plate from the disc, a thrust member transmitting pressure from the yielding means to the pressure plate, and a spring annulus intermediate the thrust member and pressure plate, said annulus having its inner and outer circumferential edges freely movable relative to the thrust member and pressure plate.

9. In a clutch, the combination of a driven shaft and a disc connected thereto, a driving pressure plate for loading the disc, means for driving the pressure plate, yielding means for loading the pressure plate, means for separating the pressure plate from the disc, a thrust member transmitting pressure from the yielding means to the pressure plate, and a spring annulus intermediate the thrust member and pressure plate, said annulus having its inner and outer circumferential edges freely movable relative to the thrust member and pressure plate but located therebetween against substantial radial displacement.

10. In a clutch, the combination of a driven shaft and a disc connected thereto, a driving pressure plate for loading the disc, means for driving the pressure plate, yielding means for loading the pressure plate, means for separating the pressure plate from the disc, and a yielding ring intermediate the yielding means and pressure plate, said ring having its outer circumferential edge acting against substantially the mid-section circumferentially of the pressure plate.

11. In a clutch, the combination of a driven shaft and a disc connected thereto, a driving pressure plate for loading the disc, means for driving the pressure plate, yielding means for loading the pressure plate, means for separating the pressure plate from the disc, and an annulus intermediate the yielding means and pressure plate, said annulus having its outer circumferential edge acting against substantially the mid-section circumferentially of the pressure plate, a thrust member, said annulus having its inner circumferential edge slidably associated with said thrust member.

12. In a clutch, the combination of a driven shaft and a disc connected thereto, a driving pressure plate for loading the disc, means for driving the pressure plate, yielding means for loading the pressure plate, means for separating the pressure plate from the disc, a thrust member transmitting pressure from the yielding means to the pressure plate, and a spring annulus intermediate the thrust member and pressure plate, said pressure plate and thrust member having spaced cooperating faces inclined relative to a plane transverse to the axis of the driven shaft to load said spring annulus.

13. In a clutch, the combination of a driven shaft and a disc connected thereto, a driving pressure plate for loading the disc, means for driving the pressure plate, yielding means for loading the pressure plate, means for separating the pressure plate from the disc, a thrust member transmitting pressure from the yielding means to the pressure plate, and a spring annulus intermediate the thrust member and pressure plate, said annulus lying substantially in a plane when the clutch is disengaged, said pressure plate having a face inclined from said plane to provide for distortion of said annulus from said plane.

ANDRE J. MEYER.